Feb. 28, 1967  K. H. HEIDENREICH  3,307,103
DEVICE FOR MEASURING AND INDICATING THE
FREQUENCY DEPENDENT CHARACTERISTICS OF
CIRCUIT ELEMENTS BY MEANS OF A CRO
Filed June 29, 1964
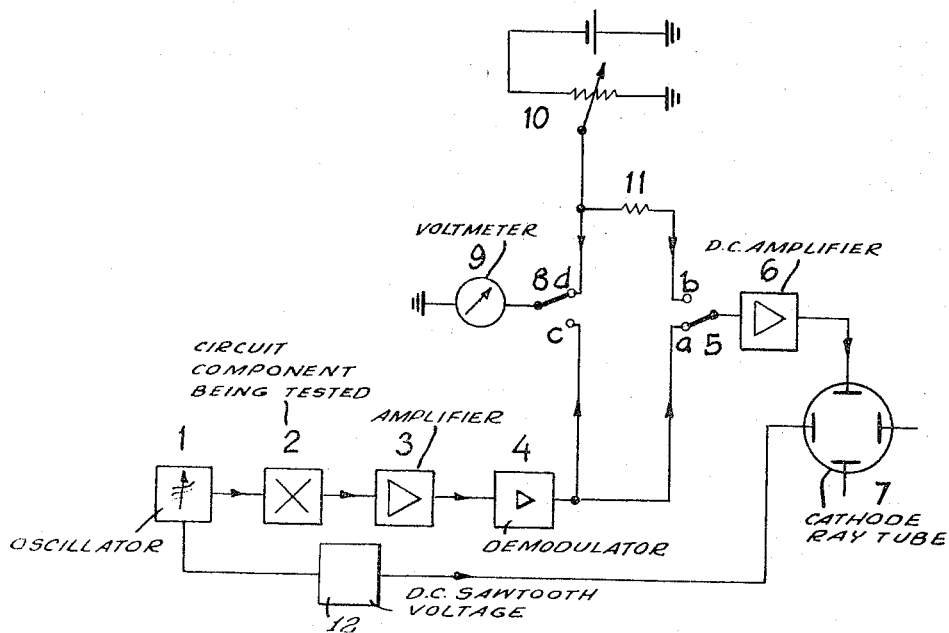
Inventor
KARL HEINZ HEIDENREICH
By Toulmin & Toulmin
Attorneys 3,307,103
DEVICE FOR MEASURING AND INDICATING THE FREQUENCY DEPENDENT CHARACTERISTICS OF CIRCUIT ELEMENTS BY MEANS OF A CRO
Karl Heinz Heidenreich, Neuhausen, Erms, Germany, assignor to Firma Wandel u. Goltermann, Reutlingen, Germany
Filed June 29, 1964, Ser. No. 378,784
Claims priority, application Germany, July 3, 1963, W 34,818
2 Claims. (Cl. 324—57)

The invention relates to a circuit arrangement for the determination of the characteristics of two-terminal networks or four-terminal networks, for example, a characteristic such as the transmission loss of filters and similar circuit elements in the telecommunication art, as a function of the frequency.

It is known, for such determinations, for the element, the characteristics of which are to be determined, to be fed on the input side with a measuring voltage of constant amplitude but periodically changing frequency. The voltage at the output of the element is then demodulated and supplied to the vertical deflecting plates (Y-plates) of a cathode ray tube, while to the horizontal deflecting plates (X-plates) of which is applied a direct voltage dependent on the instantaneous measurement frequency.

For the quantitative evaluation of the represented value, it is known alternately to apply the output of the element, as by means of an electronic or mechanical switch, and a comparison voltage which is adjustable in level to the Y-plates of an electron beam oscillograph. A so-called reference line is then visible on the screen of the cathode ray tube as well as the required function. If it is desired to determine, for example, that amount of the transmission loss which belongs to any point of the transmission curve which is represented, the reference line is brought into coincidence with this point by adjustment of a calibrated potentiometer and the corresponding value can then be read off on the potentiometer scale. The manufacture of such a scale for a variable resistance of this nature is, however, complicated and the calibration thereof is never very accurate because firstly; it must agree absolutely with the characteristics of the resistance and, secondly; it must also be adapted to the properties of the receiver, e.g., to the characteristic of the demodulator.

With sweep measuring setups, it is usual to provide the possibility of being able manually to tune the transmitter slowly from point to point, as well as to make automatic, periodic frequency changes. In this case, it is usual to employ for the indication, a calibrated measuring instrument on which it is possible directly to read off that amount of the transmission loss which belongs to the frequency corresponding to the adjustment. In this case, the output of the object of the measurement is accordingly not connected to the Y-plates of an oscillograph, but to the said measuring instrument. With frequency measurements, on the contrary, the instrument is no longer able to follow the rapid changes in the measured value and, generally, the instrument is rendered inoperative for these measurements.

With the circuit arrangement according to the present invention and more especially for determining the frequency-dependent characteristics of two-terminal networks or four-terminal networks and like elements on an oscillograph, the input of the object of the measurement being supplied with a voltage of constant amplitude and periodically changing frequency, and the demodulated output voltage of the said object serving as a vertical deflecting voltage, and a direct voltage dependent on the instantaneous measuring frequency serving as a horizontal deflecting voltage, the value to be represented and an adjustable comparison voltage being alternately connected to the vertical deflecting plates, the disadvantages of the known arrangement with a calibrated potentiometer are avoided by the fact that a measuring instrument is connected to the output of the comparison voltage means, so that the value of the adjusted comparison voltage can be read off on said measuring instrument.

The invention is more fully described by reference to the drawing wherein: the input of the object of the measurement 2, for example a filter, is connected to a generator 1, which can be continuously tuned manually. The output voltage of the said object 2 passes by way of an amplifier 3 and a demodulator 4 to the contact $a$ of a switch 5 and thence by way of a direct voltage amplifier 6 to the vertical deflecting plates of the cathode ray tube 7 of a cathode ray tube oscillograph.

A direct voltage such as a sawtooth voltage dependent on the actual measuring frequency is derived from a second output 12 of the generator and is supplied to the horizontal deflecting plates of the cathode ray tube 7. In the position $a$ of the switch 5, it is then possible to observe the transmission curve of the filter 2.

If now the switch 5 is switched over periodically between its positions $a$ and $b$, then the value to be represented and a direct voltage tapped off the variable resistance 10 are alternately applied to the Y-plates of the cathode ray tube 7, so that the transmission curve of the measurement object 2 and a reference line are visible on the screen of the cathode ray tube. If now the potentiometer 10 carries a calibrated scale, as is the case with the heretofore known arrangements, a quantitative evaluation of the represented value is then possible by reading the potentiometer scale. However, a potentiometer scale has the disadvantages already referred to.

According to the invention, the measuring instrument 9, which is provided in any case and which serves in the position $c$ of the switch 8 in a known manner for a measurement, is consequently connected through this switch (position $d$) to the tapping of the variable resistance 10.

This measuring instrument 9 is calibrated in absolute values and is adapted to the properties of the receiver circuit, more especially to the characteristics of the demodulator in the receiver. The level of the adjusted comparison voltage, namely, the reference line on the cathode ray tube 7, can accordingly be directly read off at the measuring instrument 9 during the operation.

With the arrangement according to the invention, therefore, the provided measuring instrument 9 is utilized twice, namely, in position $c$ for one measurement and, in position $d$ of the switch 8, for indicating the level of the comparison voltage.

This produces the advantages that the potentiometer 10 does not have to be calibrated and a higher absolute accuracy exists when reading off the adjusted comparison voltage than with known arrangements, where the variable resistance 10 comprises a scale.

Furthermore, easy adaptation of a sweep measuring setup is possible, since with a change-over from a calibration in nepers to decibels, for example, it is only necessary to change the scale of the measuring instrument 9, whereas with the known measuring systems, it is necessary to replace the scale of the measuring instrument and the scale of the potentiometer 10.

In the case where the direct voltage amplifier 6 is of relatively low resistance or has a leakage current, which produces on the internal resistance of the demodulator 4 a voltage drop which falsifies the measuring voltage, a resistance 11 is connected into the connecting line between the tapping of the potentiometer 10 and the contact b of the switch 5, the said resistance corresponding in value to the internal resistance of the demodulator 4, whereby the reference line and the measurement curve are changed in the same manner. The reference line is then free from errors by comparison with the measurement curve.

It will be understood that this invention is susceptible to modification in order to adapt it to different usages and conditions and, accordingly, it is desired to comprehend such modifications within this invention as may fall within the scope of the appended claims.

What is claimed is:

1. An electric circuit for effecting measurement of the frequency dependent characteristics of a circuit element comprising; a source of constant amplitude variable frequency voltage for connection to the input side of said frequency dependent element, an oscilloscope member having vertical and horizontal deflecting plates, means for rectifying the output voltage of said circuit element for being supplied to said vertical deflecting plates, a potentiometer-controlled voltage source, a first two-pole switch for connecting the vertical plates to the output of said rectifying means through one of the first switch poles and to the output of said controlled source through the other of the first switch poles, a voltage-measuring instrument, and a second two-pole switch for connecting said instrument to the output of said rectifying means through one of the second switch poles and to the output of said control source through the other of the second switch poles, said source of constant amplitude variable frequency voltage comprising a second outlet for delivering a direct voltage dependent on the actual measuring frequency to the horizontal deflecting plates.

2. The electric circuit of claim 1, in which the means for delivering the adjusted voltage to the other pole of the first switch includes a resistor equal in value to the internal resistance of the rectifying means.

References Cited by the Examiner
UNITED STATES PATENTS

| | | | |
|---|---|---|---|
| 2,816,266 | 12/1957 | Nadolski | 324—88 |
| 2,936,418 | 5/1960 | Young | 324—121 X |
| 3,102,981 | 9/1963 | Pulliam | 324—98 |

WALTER L. CARLSON, *Primary Examiner.*

E. E. KUBASIEWICZ, *Assistant Examiner.*